(No Model.)

H. ALLEY.
DRONE BEE TRAP.

No. 307,737. Patented Nov. 11, 1884.

Witnesses:
Silas M. Locke
C. Warren Brown

Inventor:
Henry Alley

UNITED STATES PATENT OFFICE.

HENRY ALLEY, OF WENHAM, MASSACHUSETTS.

DRONE-BEE TRAP.

SPECIFICATION forming part of Letters Patent No. 307,737, dated November 11, 1884.

Application filed January 21, 1884. (No model.)

*To all whom it may concern:*

Be it known that I, HENRY ALLEY, a citizen of the United States, residing at Wenham, in the county of Essex and State of Massachusetts, have invented a new and useful Drone-Bee Trap, of which the following is a specification.

My invention relates to apparatus used in apiculture for entrapping drone-bees, which consume honey but do not gather it.

The object of my invention is to provide improved means for separating the drone-bees from the rest of the colony and securely entrapping the same, to be disposed of at the pleasure of the apiarist.

The invention, hereinafter described, is embodied in a portable box to be used in connection with a bee-hive, and into which the bees are all received as they come from the hive, and from which the worker-bees freely pass into the open air while the drones are entrapped.

Figure 1:
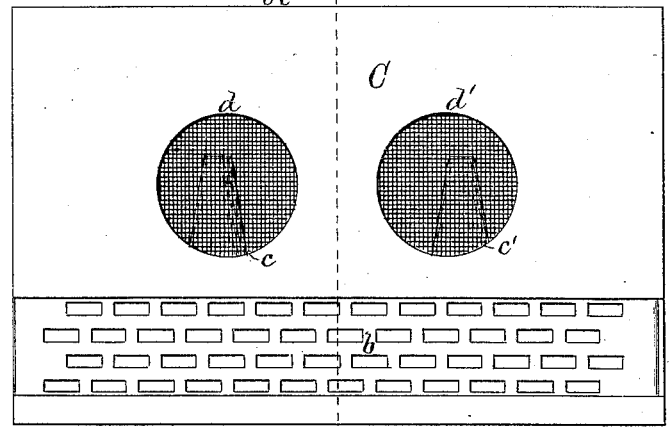
Figure 2:
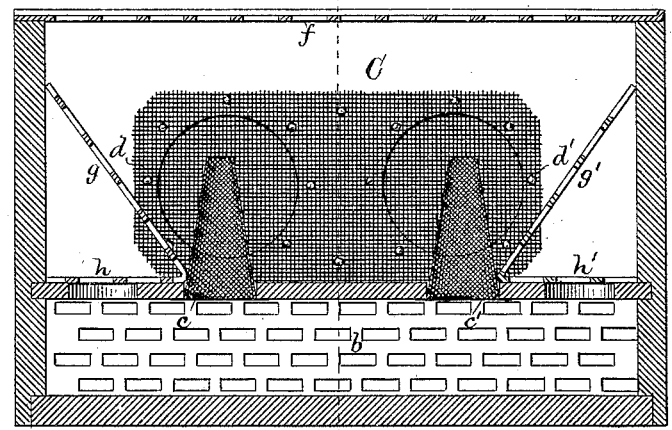
Figure 3:
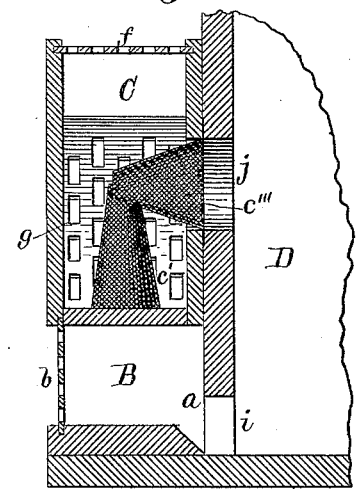

Referring to the accompanying drawings, in which similar letters refer to similar parts throughout the several views, Figure 1 is a front view of the drone-bee trap. Fig. 2 is a sectional view of the front half as seen from the rear. Fig. 3 is a cross-section showing the invention in connection with a bee-hive placed in position for use.

A, Fig. 1, is a portable box embodying my invention.

B is the receiving-apartment, provided with opening $a$, for admitting the bees as they come from the hive through the opening $i$.

$b$ is the front wall of apartment B, made movable, and arranged to slide in grooves at top and bottom, and is perforated with holes or slots of sufficient size to allow the worker-bees to freely pass and repass, but too narrow for the passage of a drone or queen bee, on account of the larger size of these last-named bees. A diameter of five thirty-seconds of an inch has been found the proper size for these holes or slots.

C is the trap-chamber communicating with receiving-apartment B by conical tubes $c$ and $c'$, of size sufficient for the passage of drone and queen bees. These tubes $c$ and $c'$ are shown as made of wire-cloth; but any material may be employed which will admit the light, and also present within chamber C a thin edge, which will prevent the bees from returning through them to receiving-apartment B.

$d$ and $d'$ are openings through the front wall of chamber C, opposite and near to tubes $c$ and $c'$, for the admission of light, and covered with wire-cloth to prevent the escape of the bees. Glass may be used to cover these openings, but the wire-cloth is preferable for the admission of air as well as light.

$f$ is the top of box A, arranged to slide in grooves, and perforated in the same manner as slide $b$, for the escape of any worker-bees which may possibly pass up with the drones through the tubes $c$ and $c'$.

$g$ and $g'$ are two inclined partitions, and $h$ and $h'$ are two covers to openings in the floor of chamber C, all of which are perforated in the same manner as the slides $b$ and $f$, to allow the downward passage of such worker-bees as would return to the hive from trap-chamber C. The inclined partitions $g$ and $g'$ are thus placed to prevent the holes in $h$ and $h'$ from becoming clogged by the bees resting upon them, while $h$ and $h'$ prevent the drone-bees, in their efforts to escape from apartment B, from filling and clogging the angular spaces above them.

D, Fig. 3, represents a portion of a bee-hive having my invention in position for use, and so arranged that as the bees pass through the hive-opening $i$ they enter directly into receiving-apartment B, and while the worker-bees will naturally pass through perforated slide $b$ the drones, being too large to follow them, will, in endeavoring to gain the open air, pass up into the lighted chamber C, where they will be securely entrapped. Should any worker-bees follow them into chamber C, they can pass up through slide $f$, or can pass back through partitions $g$ and $h$. The "busy" habits of the worker-bees will not admit of their remaining in chamber C with the drones. Thus, on a pleasant day, when the drone-bees fly abroad, all the drones in a colony of bees may be separated from the rest of the colony, to be disposed of at the pleasure of the apiculturist, while the worker-bees can proceed with their accustomed toil, passing in and out of the hive without interruption.

In Fig. 3 is shown a different method of using trap-chamber C, by which the bees are allowed to pass directly from the hive to the chamber C through openings $j$ and tube $c'''$.

As it is not essential to my invention, I do not propose to confine myself to the use of any specified number of tubes $c$, but may employ one or more, as may seem desirable. Neither is the conical form of said tubes indispensable, as straight or curved tubes of equal diameter throughout may be successfully used.

In natural swarming my invention may be used to advantage. Being placed in position at the opening of the hive previous to the issue of the swarm, the worker-bees will readily pass through slide $b$ into the open air, while the queen-bee, being too large to follow them, will pass up into the trap-chamber C, and can then be removed with the trap and used to collect the swarm wherever desirable, and thus prevent the escape and loss of the swarm.

It will be perceived that in queen raising the use of the trap will give the apiarist full control of the drones in his apiary. He can entrap and confine the undesirable ones and can let such fly as he may choose.

I do not claim as new the several parts of my invention when taken separately.

What I do claim as my invention, and desire to secure by Letters Patent, is—

1. The drone-bee trap having receiving-apartment B, provided with entrance $a$ and perforated side $b$, and having trap-chamber C, provided with tubes $c$ and $c'$, top slide, $f$, openings $d$ and $d'$, and partitions $g$ and $g'$, $h$ and $h'$, substantially as described, and for the purpose specified.

2. The combination, in a drone-bee trap having trap-chamber C, provided with one or more tubes for the entrance of the bees, and having one or more apertures for the escape of the worker-bees, said apertures being too small for the passage of drone or queen bees, of the receiving-apartment B, having entrance $a$ and perforated side $b$, substantially as set forth.

3. In combination with the bee-hive or other receptacle containing bees, drone-trap A, having entrance $a$, apartment B, perforated side $b$, tube or tubes $c$ and $c'$, and trap-chamber C, having one or more perforations for the escape of worker-bees, said apertures being too small for the passage of drone or queen bees, substantially as shown and described.

HENRY ALLEY.

Witnesses:
SILAS M. LOCKE,
C. WARREN BROWN.